US010580002B2

(12) United States Patent
Koderer et al.

(10) Patent No.: US 10,580,002 B2
(45) Date of Patent: Mar. 3, 2020

(54) EFFICIENT SERVICE AUTHORIZATION AND CHARGING IN A COMMUNICATION SYSTEM (71) Applicant: Telefonaktiebolaget LM Ericsson (publ), Stockholm (SE)

(72) Inventors: Marc Koderer, Riedstadt (DE); Wolfgang Quade, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 644 days.

(21) Appl. No.: 14/441,402

(22) PCT Filed: Nov. 9, 2012

(86) PCT No.: PCT/EP2012/072294
§ 371 (c)(1),
(2) Date: May 7, 2015

(87) PCT Pub. No.: WO2014/071992
PCT Pub. Date: May 15, 2014

(65) Prior Publication Data
US 2015/0294311 A1 Oct. 15, 2015

(51) Int. Cl.
*G06Q 20/40* (2012.01)
*H04M 15/00* (2006.01)
(Continued)

(52) U.S. Cl.
CPC ........... *G06Q 20/40* (2013.01); *G06Q 20/085* (2013.01); *H04M 15/65* (2013.01);
(Continued)

(58) Field of Classification Search
CPC ........ G06Q 20/085; G06Q 20/40; H04W 4/24
See application file for complete search history.

(56) References Cited

U.S. PATENT DOCUMENTS 5,450,477 A * 9/1995 Amarant ............ G06Q 20/4037
379/114.17
5,559,871 A * 9/1996 Smith ................... H04M 15/00
379/114.01
(Continued)

FOREIGN PATENT DOCUMENTS

CN 1290449 A 4/2001
CN 1826766 A 8/2006
(Continued)

OTHER PUBLICATIONS

Authors: "Ingo Borchert, Batshur Gootiiz, Aaditya Mattoo" Title "Policy Barriers to International Trade in Services" "Evidence from a New Database" "The World Bank Development Research Group Trade and Integration Team Jun. 2012" (Year: 212).*
(Continued)

*Primary Examiner* — Kito R Robinson
*Assistant Examiner* — Tony P Kanaan
(74) *Attorney, Agent, or Firm* — Sage Patent Group (57) ABSTRACT An approach is disclosed for service authorization and service charging in a communication network relying on executing a real time service authorization for a requested service by determining an upper estimate of a service charge for the requested service, comparing the upper estimate with a balance value of an account used for charging the requested service and when affirmative authorizing the requested service. Then follows a calculation of an accurate service charge for the requested service in a batch mode without real time requirements after the real time service authorization.

26 Claims, 8 Drawing Sheets (51) Int. Cl.
*H04W 12/08* (2009.01)
*G06Q 20/08* (2012.01)

(52) U.S. Cl.
CPC ......... *H04M 15/705* (2013.01); *H04M 15/85* (2013.01); *H04M 15/854* (2013.01); *H04M 15/88* (2013.01); *H04M 15/882* (2013.01); *H04M 15/885* (2013.01); *H04W 12/08* (2013.01); *H04M 2203/6081* (2013.01)

(56) References Cited

U.S. PATENT DOCUMENTS

| | | | | |
|---|---|---|---|---|
| 6,553,108 | B1* | 4/2003 | Felger | G06Q 20/12 379/114.01 |
| 6,947,723 | B1* | 9/2005 | Gurnani | H04M 15/00 379/114.01 |
| 7,937,299 | B1* | 5/2011 | Ahles | G06Q 40/12 705/30 |
| 8,204,809 | B1* | 6/2012 | Wise | G06Q 40/06 705/35 |
| 9,747,596 | B2* | 8/2017 | Brody | G06Q 20/4016 |
| 2003/0083041 | A1* | 5/2003 | Kumar | H04M 15/00 455/406 |
| 2003/0216934 | A1 | 11/2003 | Pfoertner | |
| 2004/0230535 | A1* | 11/2004 | Binder | G06Q 20/04 705/64 |
| 2007/0136195 | A1 | 6/2007 | Banjo | |
| 2007/0262137 | A1* | 11/2007 | Brown | G06Q 20/10 235/380 |
| 2010/0318463 | A1* | 12/2010 | Reany | G06Q 20/04 705/44 |
| 2011/0047045 | A1* | 2/2011 | Brody | G06Q 20/3226 705/26.41 |
| 2011/0313903 | A1* | 12/2011 | C. | G06Q 20/367 705/34 |
| 2012/0036073 | A1* | 2/2012 | Basu | G06Q 20/40 705/44 |
| 2013/0018821 | A1* | 1/2013 | Shao | G06Q 50/06 705/412 |
| 2013/0185167 | A1* | 7/2013 | Mestre | G06Q 20/20 705/21 |
| 2013/0274003 | A1* | 10/2013 | Costello | G07F 17/3244 463/25 |

FOREIGN PATENT DOCUMENTS

| | | |
|---|---|---|
| WO | WO 99/40717 A1 | 8/1999 |
| WO | WO 03/032657 A1 | 4/2003 |
| WO | WO 2005/011205 A1 | 2/2005 |
| WO | WO 2006/136891 A1 | 12/2006 |

OTHER PUBLICATIONS

International Search Report, International Application No. PCT/EP2012/072294 dated Jul. 10, 2013, 5 pages.

Written Opinion of the International Searching Authority, International Application No. PCT/EP2012/072294 dated Jul. 10, 2013, 7 pages.

First Office Action with English language translation, Chinese Patent Application No. 201280076931.9, dated Sep. 1, 2016.

* cited by examiner

EFFICIENT SERVICE AUTHORIZATION AND CHARGING IN A COMMUNICATION SYSTEM

CROSS REFERENCE TO RELATED APPLICATION

This application is a 35 U.S.C. § 371 national stage application of PCT International Application No. PCT/EP2012/072294, filed on 9 Nov. 2012, the disclosure and content of which is incorporated by reference herein in its entirety. The above-referenced PCT International Application was published in the English language as International Publication No. WO 2014/071992 A1 on 15 May 2014.

TECHNICAL FIELD

The present invention relates to efficient service authorization and charging in a communication system, and in particular to an efficient service charge estimation process in combination with real time service authorization.

BACKGROUND

Generally, the customer base of operators of communication networks is, for historical reasons, divided into so-called pre-paid and post-paid customers because the related time scales for processing of charges have been different according to several orders of magnitude.

Pre-paid customers are related to immediate, real-time price calculation, and post-paid customers require a billing, e.g., according to once-a-month scheme. This is the reason why pre-paid business is associated generally with the network division of the operator of the communication network, while the post-paid billing is allocated to the billing department.

However, with the issuance of a Bill-Shock-Prevention law real-time billing now also is a must for post-paid customers.

So far, in pure post-paid billing systems the price determination does not have any real-time requirements, as the billing process is normally initiated once a month. For this reason, post-paid billing systems use batch-oriented processing with files containing hundreds of single call information records. Then, these single call information records are forwarded within a bundle in the charging system and are processed for contract mapping, rating/cost control, so that finally the related billing results may be stored in a database. Here, the billing with aggregated records may be efficient because the process may benefit from inherent scheduling algorithms in alignment with the architecture of the processing system.

To the contrary, real-time billing systems are usually using interrupt-based data communication, as every single billing record must be processed with a certain timeframe. The real-time requirement necessitates the forwarding of every single billing record without any aggregation between different billing records.

Here, existing real-time billing systems burden the computer with a high number of context switches, process re-scheduling processes, cache invalidations, etc., in order to respond to a single billing record as fast as possible. Therefore, a latency-response distribution which is billed up from the response processing times of submitted billing records has a large standard deviation or equivalently is smeared out.

However, when the response time for a billing record exceeds a certain threshold of about 50 to 150 milliseconds, the related service which is to be charged will either be cut or lose priority in the communication network. Such degradation of a service to be billed leads to customer disappointment and finally to a degradation in the revenue of the operator of the communication network.

SUMMARY

In view of the above the object of the present invention is to improve the acceptance rate and processing speed of a service request which is submitted to a communication network for service authorization and service delivery.

According to an aspect of the present invention this object is achieved by a method of service authorization and service charging in a communication network. The method comprises the steps of executing a real time service authorization for a requested service and calculating an accurate service charge for the requested service in a batch mode without real time requirements after the real time service authorization. Here, real time service authorization for a requested service is achieved by determining an upper estimate of a service charge for the requested service, by comparing the upper estimate with a balance value of an account used for charging the requested service and when affirmative, by authorizing the requested service.

Further, according to a further aspect of the present invention the object outlined above is achieved by an apparatus realizing a service authorization and a service charging process for use in a communication network.

According to the further aspect, the apparatus comprises a real time authorization unit adapted to execute a real time service authorization for a requested service and a service charge calculation unit adapted to calculate an accurate service charge for the requested service in a batch mode without real time requirements after the real time service authorization.

Further, the real time authorization unit is provided with an estimation unit adapted to determine an upper estimate of a service charge for the requested service, a comparison unit adapted to compare the upper estimate with a balance value of an account used for charging the requested service, and an authorization unit adapted to authorize the requested service when the comparison is affirmative.

BRIEF DESCRIPTION OF THE DRAWING

In the following a detailed description of the present invention will be given with reference to the drawing in which.

DETAILED DESCRIPTION

In the following, details of the present invention will be described with reference to preferred embodiments and the drawing. Here, it should be noted that insofar as related functionality of the present invention is described, this functionality may be realized either in software, hardware, or a combination thereof.

Further, generally according to embodiments of the present invention, real-time service charge calculation and service authorization is split into a fast real-time authorization and a service charge calculation batch process without real time requirements. Here, it should be understood that real-time implies response to a submitted request within specified bounds of time in contrast to batch-process-oriented processing of a request by time periods being orders of magnitude higher than those available for real-time processing.

Further, the real-time service authorization process consists of several steps which have to be executed in sequence. Here, real-time admission of a submitted request implies only an estimation of service charges and not an accurate pricing thereof. If an account used for charging of the service holds enough money for charging the request service—or in other words if the balance value of the account is high enough—there is no need to determine the exact service charges within a real-time scenario, as this may be done in a batch processing subsequent to authorization of the requested service.

Therefore, it is suggested to use for the initial authorization an upper estimate for the requested service to decide whether to accept the service request or not.

Further, it is suggested to have a re-authorization of services which have been admitted initially. To this purpose, there are provided certain service periods, i.e. time periods or periods of transmission of a prescribed data volume, upon expiry of which the allowability of a service is considered again. Here, it is suggested to start with a re-estimation of service costs in a batch mode in a good time prior to re-authorization, which may also be considered as "lookahead" calculation of service charges prior to re-authorization.

Overall, embodiments of the present invention allow for a separation of service charge calculation processes into a fast real-time part in support of service admission using simple estimations, e.g., on a millisecond time scale, and further a batch part on a time scale of, e.g., 1 or several seconds, so as to calculate the true service charge accounting for all details of the service delivery and the underlying service contract. Then, the true service charge is used to replace an upper bound estimation on the service accounts which was reserved immediately after the initial admission of the service.

Further, according to embodiments of the present invention, due to the time scale separation for initial service admission using real-time processing and subsequent re-authorization in a batch mode, initial single service requests may be bundled into a plurality of service requests for subsequent re-calculation of the service charges in a batch mode, so as to improve significantly the efficiency of the overall service charge processing.

Figure 1:
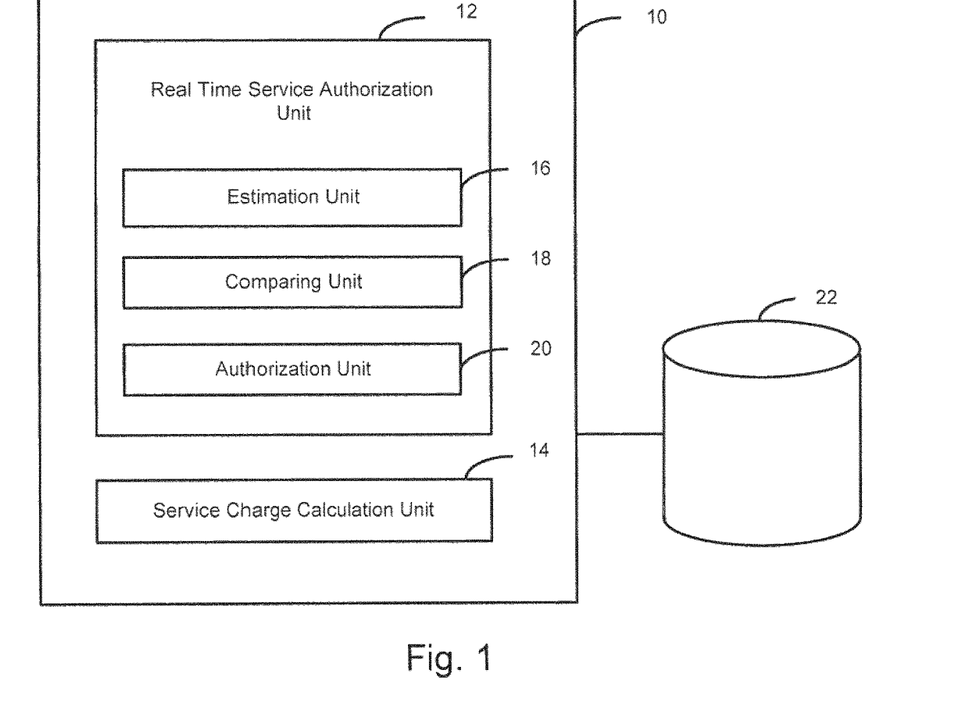
FIG. 1 shows a schematic diagram of a service authorization and charging apparatus for use in a communication network according to an embodiment of the present invention.

FIG. 1 shows a schematic diagram of a service authorization and charging apparatus 10 for use in a communication network according to an embodiment of the present invention.

As shown in FIG. 1, the service authorization and charging apparatus 10 comprises a real time service authorization unit 12 and a service charge calculation unit 14. The real time service authorization unit 12 comprises an estimation unit 16, a comparing unit 18, and an authorization unit 20.

Further, as shown in FIG. 1, the service authorization and charging apparatus 10 is connected to an account or account data base 22 used for the charging of the requested service. Here, the account data base 22 stores service contract related information, the status of at least one account, the relation of at least one service and at least one account used for charging the service, and at least one upper bound that may be charged from the at least one account according to the type of the at least one service.

Here, it should be noted that according to embodiments of the present invention there is used a differentiation between an estimate of service charge, between a balance value being available for charging the requested service, e.g., an upper bound assigned from the relevant account for charging the requested service, and between overall total resources assigned to an account. The introduction of a balance value or an upper bound allows splitting available money from, e.g., a single account between different service types or different requested services. This leads to a situation where a single service may not use all monetary resources from an account. This increases the availability of services also to other users and therefore the acceptance of service requests and overall increase of operator profits.

It should be noted that the allocation of balance values may differ between different accounts, different types of services, and different user groups, as an example. Also, the allocation of such balance values or upper bounds may be determined by the network operator.

Figure 2:
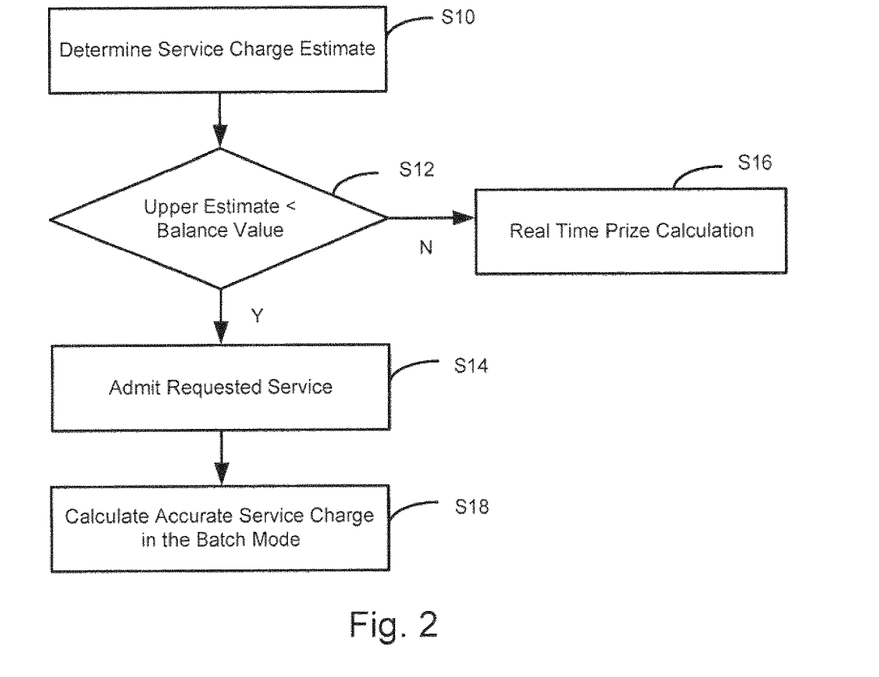
FIG. 2 shows a flowchart of operation of the service authorization and charging apparatus shown in FIG. 1.

FIG. 2 shows a flowchart of operation of the service authorization and charging apparatus 10 shown in FIG. 1.

As shown in FIG. 2, in a step S10, operatively being executed by the estimation unit 16 of the real time service authorization unit 12, there is determined an upper estimate of a service charge for the requested service.

As shown in FIG. 2, in a step S12, operatively being executed by the comparing unit 18 of the real time service authorization unit 12, the upper estimate is compared with the balance value of the account used for charging the requested service.

As shown in FIG. 2, in a step S14, operatively being executed by the authorizing unit 20 of the real time service authorization unit 12, the requested service is authorized when the upper estimate is not exceeding the balance value, i.e. when the comparison is affirmative.

As shown in FIG. 2, when the comparison in step S12 is not affirmative, in a step S16, operatively being executed by the service charge calculation unit 14 of the service authorization and charging apparatus 10, the submitted service request is handled on the basis of a real time price calculation for determination of a correct service charge. If the correct service charge is lower than the balance value the requested service may still be authorized, however, at the cost of a time delay necessary to execute the real time price calculation in the step S16.

As shown in FIG. 2, in a step S18, operatively being executed by the service charge calculation unit 14 of the real time service authorization unit 12, there is calculated an accurate service charge for the requested service in a batch mode after the real time service authorization.

Here, it should be noted that the calculation of the accurate service charge may account for all applicable details of service delivery. Here, applicable means that for calculation of the service charge not necessarily all available parameters are in fact used for every rating. To the contrary there may be considered only parameters which are defined in an applicable part of a rate plan, e.g., time of the day, subscriber category, type of requested service, location, subscribed rate plan, etc.

Figure 3:
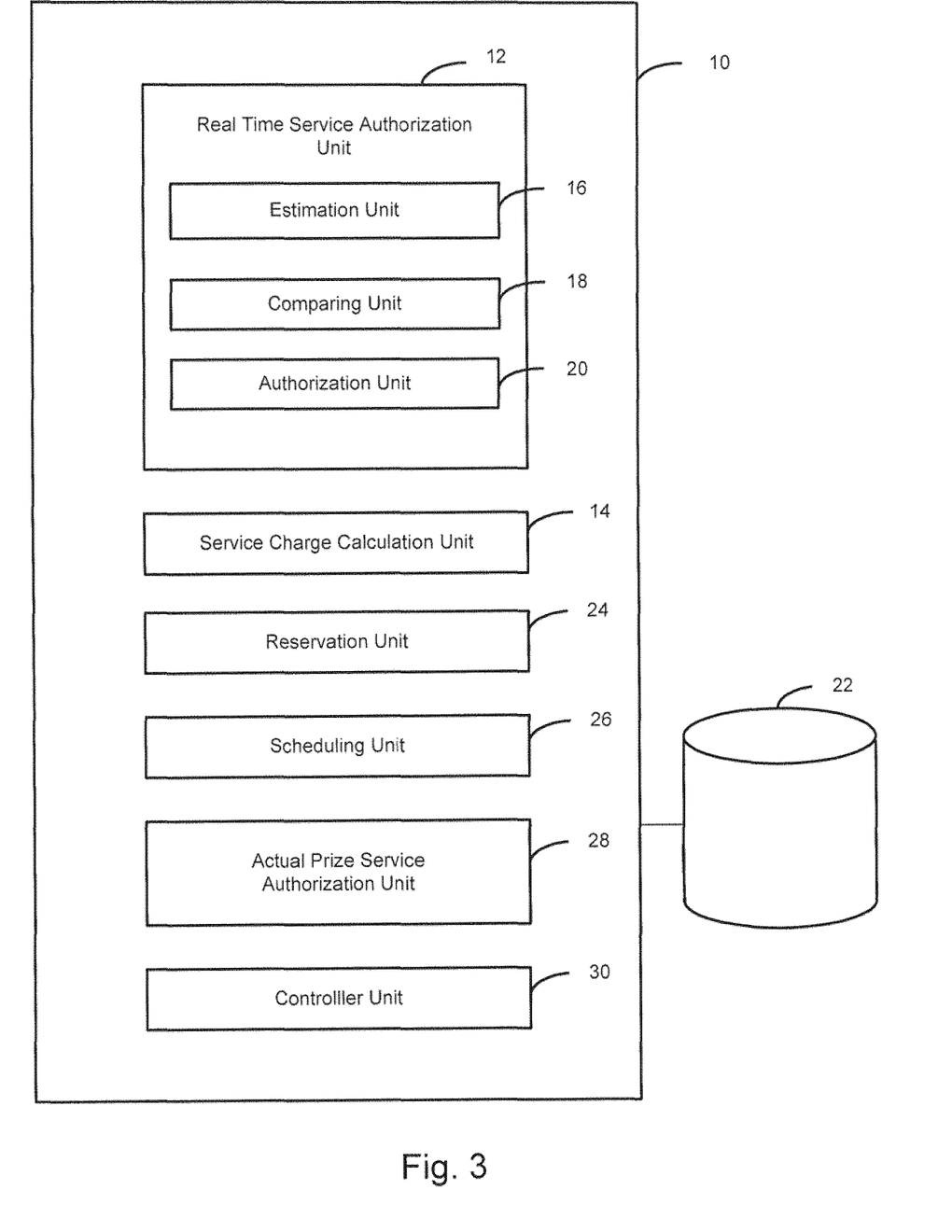
FIG. 3 shows a further detailed schematic diagram of the service authorization and charging apparatus shown in FIG. 1.

FIG. 3 shows a further detailed schematic diagram of the service authorization and charging apparatus 10 shown in FIG. 1.

As shown in FIG. 3, aside the components of the service authorization and charging apparatus 10 shown in FIG. 1 and explained above with respect to FIG. 1 and FIG. 2, the service authorization and charging apparatus 10 further comprises a reservation unit 24, a scheduling unit 26, an actual price service authorization unit 28, and a controller unit 30.

Figure 4:
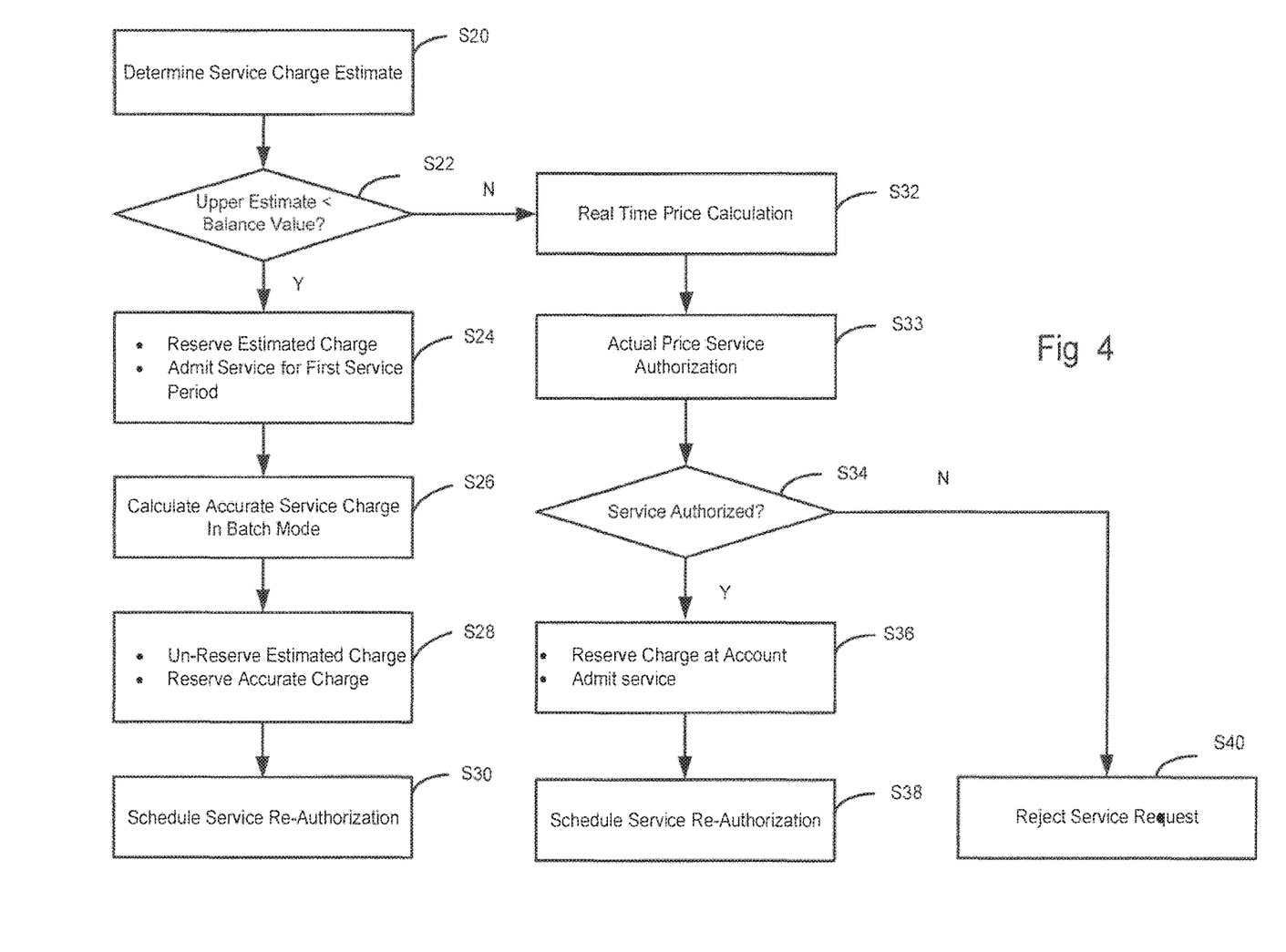
FIG. 4 shows a flowchart of operation of the service authorization and charging apparatus shown in FIG. 3 with respect to the initial service authorization.

FIG. 4 shows a flowchart of operation of the service authorization and charging apparatus 10 shown in FIG. 3 with respect to the initial service authorization.

As shown in FIG. 4, in a step S20, operatively being executed by the estimation unit 16 of the real time service authorization unit 12, there is estimated a service charge as explained above with respect to step S10 shown in FIG. 2.

As shown in FIG. 4, in a step S22, operatively being executed by the comparing unit 18 of the real time service authorization unit 12, the estimated service charge is compared with the balance value as explained above with respect to step S12 shown in FIG. 2. When the estimated service charge is lower than the balance value, the authorization process continues with a step S24. Otherwise, the controller unit 30 terminates the real time service authorization and switches to a service authorization on the basis of an actual price calculation in real time in a step S32.

Here, in the step S32, operatively being executed by the actual price service authorization unit 28 of the service authorization and charging apparatus 10, there is implemented the standard service request admission procedure relying an accurate service charge determination in real time without any estimation process. While this takes more time compared to the real time mode service authorization, the user still has an opportunity to get a submitted service request allowed when the real time mode service authorization more accurately determines service charges as actually being lower than estimated service charges.

As shown in FIG. 4, when the interrogation step S22 is affirmative there follows step S24, operatively being executed by the authorization unit 20 and the reservation unit 24 of the service authorization and charging apparatus 10, to authorize the service request and to reserve the upper estimate at the account 22 which is used for charging the requested service. Here, the authorization of the service request implies that the request service is admitted for a first period of time.

Here, it should be noted that the first period may be flexibly determined according to embodiments of the present invention. A first option for determination of the first period would be a setting of pre-determined period in time. Otherwise, if a service is related to the transfer of data, then such a first period could be related to transfer of a pre-specified amount of data. In the latter case, the related time period may vary in dependence of the load on the communication network delivering the requested service.

As shown in FIG. 4, in a step S26 corresponding to the step S18 shown in FIG. 2 and operatively being executed by the service charge calculation unit 14 of the service authorization and charging apparatus 10, the accurate service charge for the requested service is calculated, e.g., while accounting for all details of service delivery. Here, the accurate service charge is again determined in a batch mode without real time requirements.

As shown in FIG. 4, in a step S28, operatively being executed by the reservation unit 24 of the service authorization and charging apparatus 10, the upper estimate is un-reserved in the account 22 and the accurate service charge for the requested service is reserved in the account 22.

As shown in FIG. 4, in a step S30, operatively being executed by the scheduling unit 26 of the service authorization and charging apparatus 10, there is scheduled a re-authorization of the requested service after expiry of the first service period.

As shown in FIG. 4 and explained above with respect to the interrogation step S22, when the real time service authorization fails, there is executed a step S32, operatively being executed by the actual price service authorization unit 28 of the service authorization and charging apparatus 10. In the step S32 there is executed the standard service request admission procedure relying an accurate service charge determination without any estimation thereof.

As shown in FIG. 4, then follows an interrogation step S34, operatively being executed by the controller unit 30, to interrogate whether the actual price service authorization is successful.

As shown in FIG. 4, when the actual price service authorization is successful there follows a step S36, operatively being executed by the reservation unit 24 of the service authorization and charging apparatus 10, to reserve the determined charges at the account 22 and to admit the requested service.

As shown in FIG. 4, subsequent to service charge reservation and service admission there follows a step S38, operatively being executed by the scheduling unit 26 of the service authorization and charging apparatus 10, to schedule a re-authorization of the requested service after expiry of a pre-determined service period, e.g., the first service period.

As shown in FIG. 4, when actual price service authorization is not successful there follows a step S40, operatively being executed by the controller unit 30 of the service authorization and charging apparatus 10, to reject the submitted service request.

Figure 5:
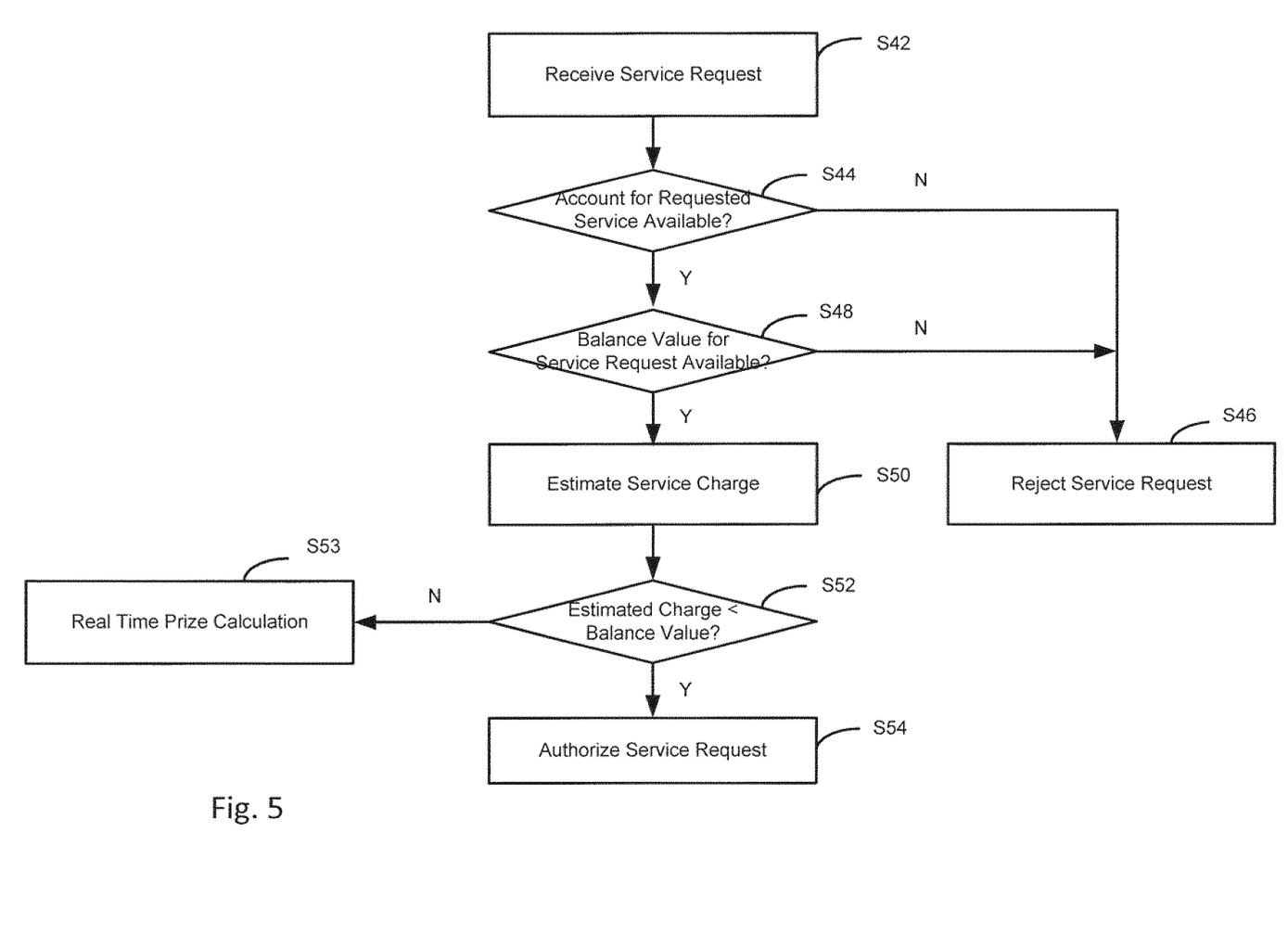
FIG. 5 shows a flowchart of operation of the service authorization and charging apparatus shown in FIG. 3 with respect to real time service authorization during initial service authorization.

FIG. 5 shows a flowchart of operation for the service authorization and charging apparatus 10 shown in FIG. 3 with respect to real time service authorization during initial service authorization.

As shown in FIG. 5, initially in a step S42 operatively being executed by the real-time service authorization unit 12 of the service authorization and charging unit 10, there is received a request for service delivery.

As shown in FIG. 5, then follows an interrogation step S44, operatively being executed by the controller unit 30 of the service authorization and charging unit 10, to check whether an account for the requested services is available or not. E.g., there might be the situation where a user is only assigned, e.g., to voice services, nevertheless, requests delivery of a data service, or vice versa. If the interrogation in the step S44 is not affirmative the controller unit 30 executes a step S46 to reject the submitted service request.

As shown in FIG. 5, if the interrogation in step S44 is affirmative, then follows a further interrogation S48, executed by the comparing unit 18 of the real-time service authorization unit 12 to evaluate whether a balance value or an upper bound for the reservation is available. If the outcome of this interrogation is not affirmative, then again the step S46 will be executed to reject the submitted service request.

Otherwise, there follows a step S50, operatively being executed by the estimation unit 16 of the real-time service authorization unit 12, to estimate a service charge in relation to the submitted service request.

Here, it should be noted that according to embodiments of the present invention any scheme for estimating of service charges is applicable.

E.g., one could consider estimating a service charge in consideration of admission of the service for a pre-determined period of time. If so, then estimation could be achieved by multiplying the admission time period with a rate reflecting money per time.

As another example, e.g., for data services, one could consider admitting a service for a predetermined data volume and estimating the related service charge by multiplying the volume of the admitted data volume with a rate of money per data unit.

Of course, also a combination of such service cost estimation is applicable within the framework of the present invention.

As shown in FIG. 5, subsequent to the step S50 there follows an interrogation step S52, corresponding to the step S12 shown in FIG. 2 and being executed by the comparing unit 18 of the real-time service authorization unit 12, to determine whether the estimated service charge is lower than the balance value or upper bound being relevant for the considered service request. If not, then follows the step S53 to initiate actual price service authorization. Otherwise, in the affirmative case there follows a step S54 corresponding to step S14 shown in FIG. 2 and being executed by the authorization unit 20 of the real-time service authorization unit 12 to authorize the submitted service request.

Figure 6:
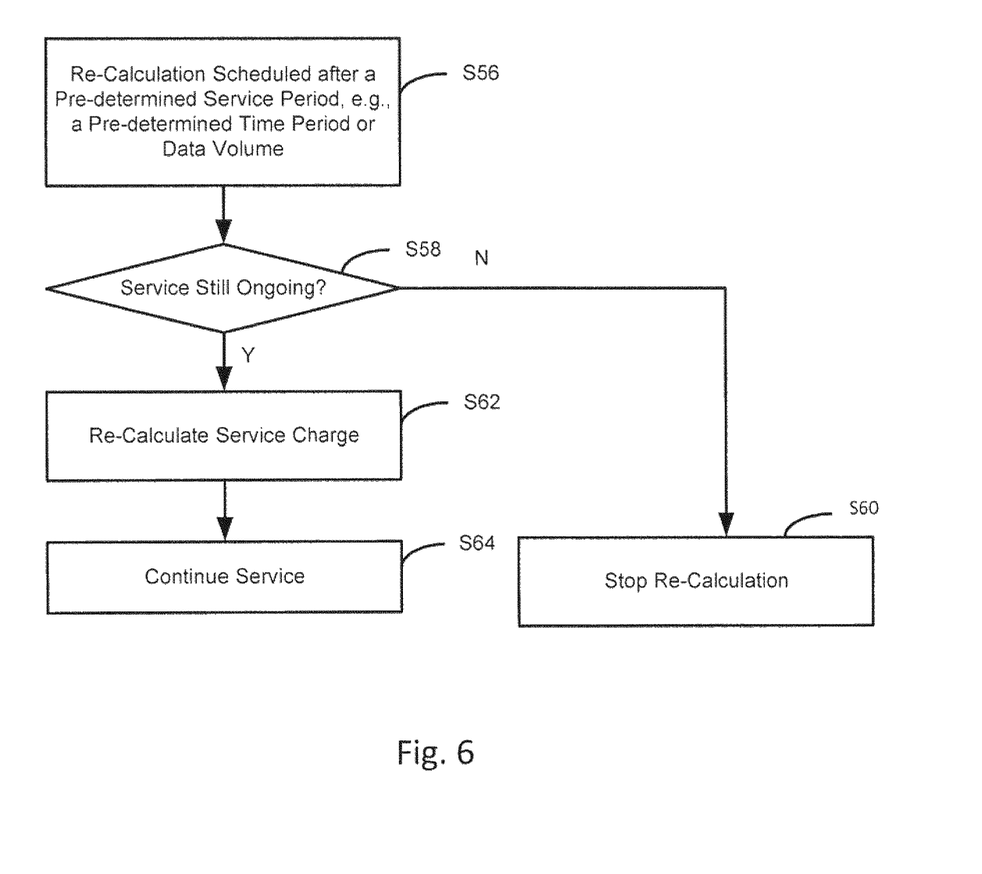
FIG. 6 shows a flowchart of operation of the service authorization and charging apparatus shown in FIG. 3 with respect to re-calculation of service charges.

FIG. 6 shows a flowchart of operation of the service authorization and charging apparatus 10 shown in FIG. 3 with respect to re-calculation of service charges.

While above different aspects of the present invention being related to the initial setup and admission of a service request and related service charge estimation have been described with respect to FIGS. 1 to 5, in the following there will be explained what happens once a service has been admitted to the communication network.

Generally, according to embodiments of the present invention it is suggested to have a repeated re-consideration of the allowability of a service in view of used-up service charges and available service resources from the account.

As shown in FIG. 6, to this purpose there is executed a step S56, operatively being executed by the scheduling unit 26 of the service authorization and charging apparatus 10, to evaluate whether the time for re-calculation of service charges has come, e.g., after expiry of the pre-determined service period or after transfer of a pre-allocated data volume.

As shown in FIG. 6, then follows an interrogation step S58 operatively being executed by the controller unit 30 of the service authorization and charging apparatus 10, to interrogate whether the service is still ongoing or not. If not, then the controller 30 will stop the re-calculation in a step S60.

Otherwise, there will follow a step S62, operatively being executed by the service charge calculation unit 14 of the service authorization and charging apparatus 10, to re-calculate service charges in line with network resources used for service delivery so far.

As shown in FIG. 6, there will follow a step S64, operatively being executed by the controller 30 of the service authorization and charging apparatus 10, to continue the service delivery until the time for a re-authorization of the delivered service will come.

As already outlined above, this means that it is suggested to re-calculate a service charge during service delivery in a batch mode so as to have such a re-calculated service charge available at a point in time when the actual re-authorization takes place.

Figure 7:
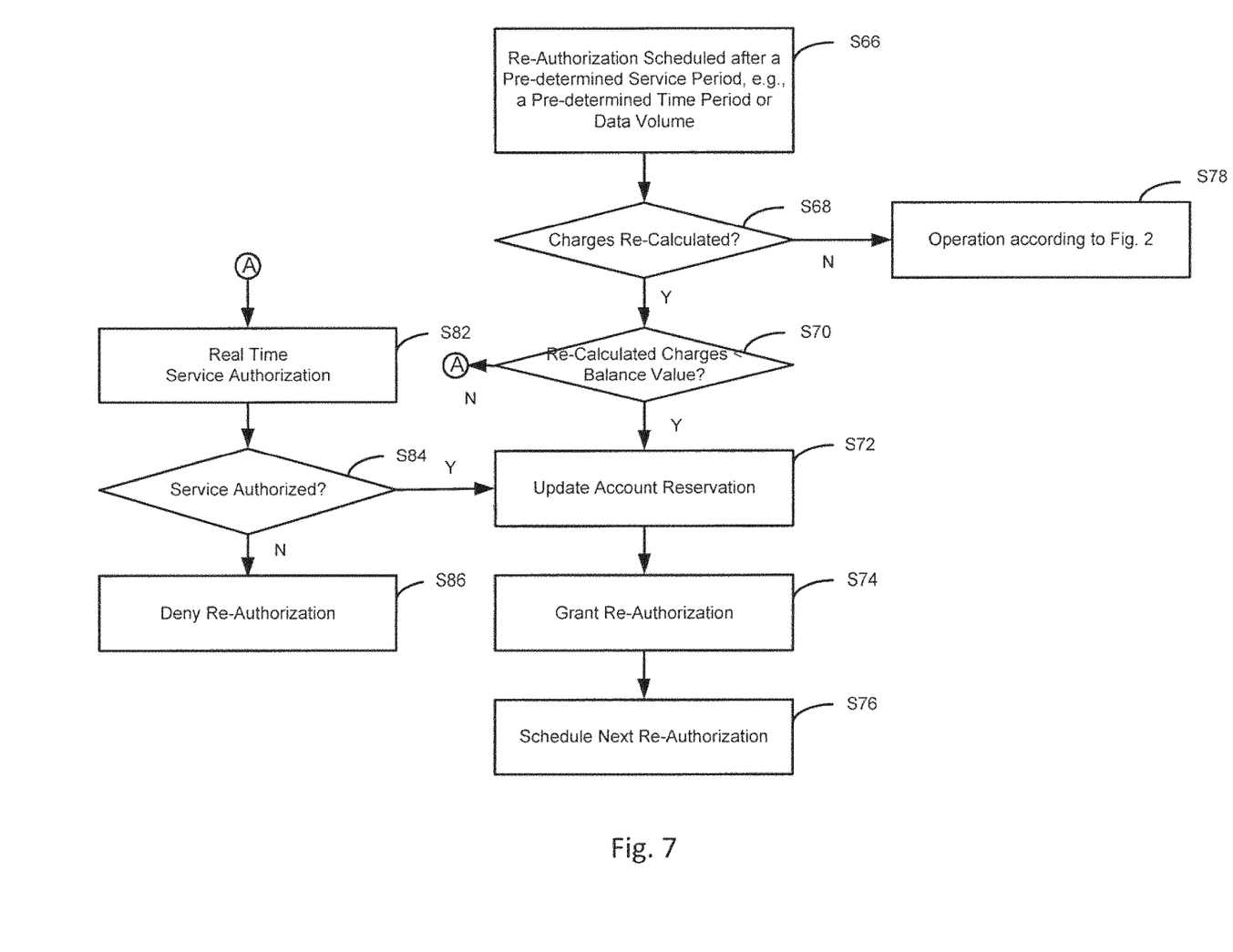
FIG. 7 shows a flowchart of operation of the service authorization and charging apparatus shown in FIG. 3 with respect to re-authorization of a service after a pre-determined duration of service delivery.

FIG. 7 shows a flowchart of operation of the service authorization and charging apparatus shown in FIG. 3 with respect to re-authorization of a service after a pre-determined duration of service delivery.

As shown in FIG. 7, for re-authorization of service delivery according to the present invention there is executed a step S66, operatively being executed by the scheduling unit 26 of the service authorization and charging apparatus 10. This step S66 serves to determine whether the actual point in time during service delivery for re-authorization of the service has come, i.e. according to a scheduling of a pre-determined time period or scheduling of delivery of a pre-determined data volume. As an alternative, a re-authorization may as well be requested externally from the network side, e.g., the network operator, or the service user or any other third party.

As shown in FIG. 7, different scenarios may occur at the time of re-authorization.

As shown in FIG. 7, a first such scenario may be that charges have not been re-calculated prior to re-authorization. Then, this would trigger the right path of the flowchart shown in FIG. 7 so as to trigger the operation outlined above with respect to FIG. 2. Otherwise, if re-calculated charges are available, then these would be used for re-authorization of the considered service.

As shown in FIG. 7, when the re-calculated or estimated charges are higher than the balance value or upper bound, then follows a actual price service authorization to give the user a chance to have the service still being delivered, although re-calculated or estimated service charges are higher than a pre-determined balance value.

In more detail and as shown in FIG. 7, there is executed a step S68, operatively being executed by the controller unit 30 of the service authorization and charging apparatus 10, to evaluate whether re-calculated charges are available at the time of re-authorization of a considered service.

As shown in FIG. 7, if the interrogation in step S68 is affirmative, then there follows a step S70, operatively being executed by the controller unit 30 of the service authorization and charging apparatus 10, to evaluate whether the re-calculated service charges are smaller than the balance value or upper bound specified for the considered service.

As shown in FIG. 7, if the interrogation in step S70 is affirmative, then follows a step S72, operatively being executed by the reservation unit 24 of the service authorization and charging apparatus 10, to update the account reservation for the considered service. In a subsequent step S74, operatively being executed by the controller 30, the considered service will be granted a re-authorization.

Finally, in a step S76, operatively being executed by the scheduling unit 26 of the service authorization and charging apparatus 10, the next re-authorization will be scheduled.

As shown in FIG. 7, if the interrogation in step S68 is not affirmative, there follows the operational flow as outlined above with respect to FIG. 2.

As shown in FIG. 7, if the interrogation in step S70 is not affirmative, then the procedure continues with a step S82, to switch the admission mode from an estimation based mode to an actual price based mode of service authorization. The step S82 is operatively being executed by the actual price service authorization unit 28 of the service authorization and charging apparatus 10.

Upon execution of the actual price based service authorization, the service charges will be determined according to the usual scheme in consideration of all applicable specifics of service details.

As shown in FIG. 7, subsequent to step S82 there follows an interrogation step S84, operatively being executed by the controller unit 30 of the service authorization and charging apparatus 10, to evaluate that the actual service charges are lower than the related balance value so as to continue service delivery. If so, there follow steps S72 to S76 for reservation update, service re-authorization, and scheduling of the next re-authorization step. Otherwise, there follows a step S86 operatively executed by the controller unit 30 so as to deny re-authorization of the service.

Further to the above, it should be noted that the process of re-calculating of an accurate service charge for a requested service in a batch mode during service delivery after expiry of a related service period followed by a re-authorization of the requested service in view of the outcome of the re-calculated service charges may be executed repeatedly. One approach to implement such repetition would be to execute related processes in a periodic manner. Another approach would be to implement the repetition according to a pre-determined timing scheme which needs not be periodic.

Figure 8:
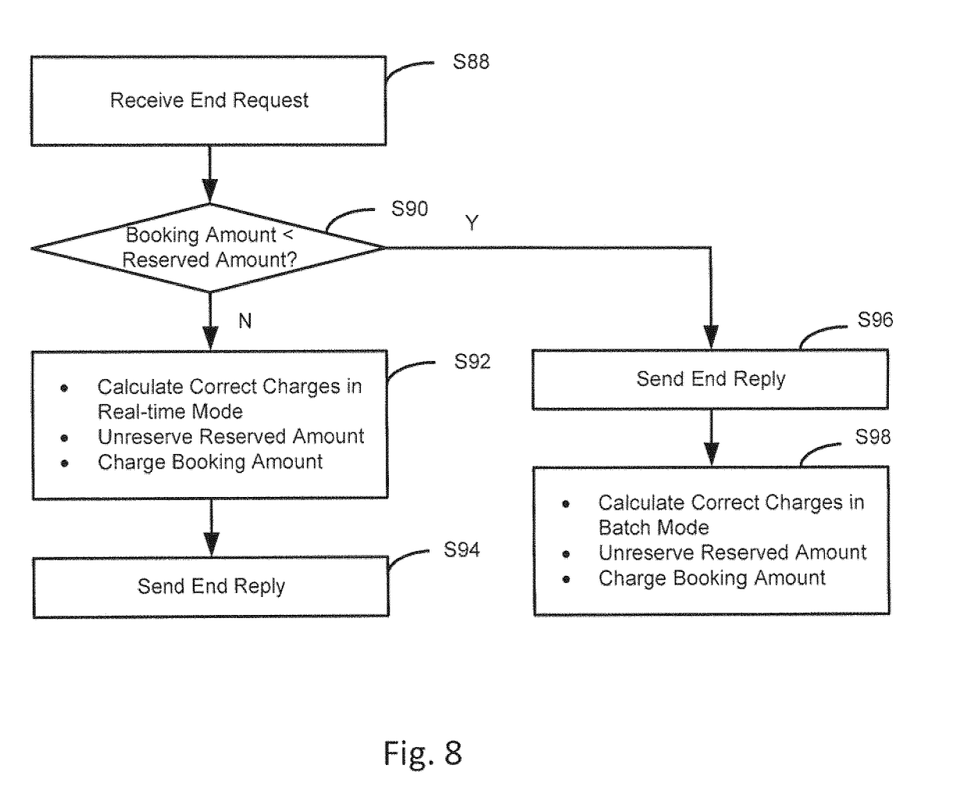
FIG. 8 shows a flowchart of operation of the service authorization and charging apparatus shown in FIG. 3 with respect to the termination of a service session.

FIG. 8 shows a flowchart of operation of the service authorization and charging apparatus 10 shown in FIG. 3 with respect to the termination of a service session.

As shown in FIG. 8, in a first step S88, operatively being executed by the controller unit 30 of the service authorization and charging apparatus 10, there is received a request to end a service delivery.

As shown in FIG. 8, there follows a step S90, operatively executed again by the controller unit 30, so as to determine whether the final booking amount is smaller than the currently reserved amount.

While it is understood that according to the present invention such step would not be necessary, assuming that the reservation always covers in advance a service delivery, the step S90 may be provided as a safeguard to again check the correct amounts at the end of service delivery, e.g., in a redundant manner.

As shown in FIG. 8, assuming that for some reasons the booking amount is larger than a reserved amount, then in a step S92, operatively executed by the service charge calculation unit 14, the reservation unit 24 and the controller unit 30 of the service authorization and charging apparatus 10, there will be calculated the correct charges, followed by an un-reservation of reserved amounts from the account and the charging of the correct booking amount at the account in a step S92. Then, the controller unit 30 will send an end reply in a step S94.

As shown in FIG. 8, if the interrogation in step S90 is affirmative, then there will follow a step S96, operatively being executed by the controller 30 to immediately send the end reply to the requesting service, followed by a step S98, executed by the service charge calculation unit 14, the reservation unit 24, and the controller unit 30 of the service authorization and charging apparatus 10 to calculate the final correct charges, to un-reserve reserved amount and to charge the correct final booking amount to the account 22.

It should be noted that it is also possible to aggregate a plurality of service charge re-calculation processes into a single batch process for service charge re-calculation for a plurality of services in a batch mode so as to increase overall processing efficiency as outlined above.

Figure 9:
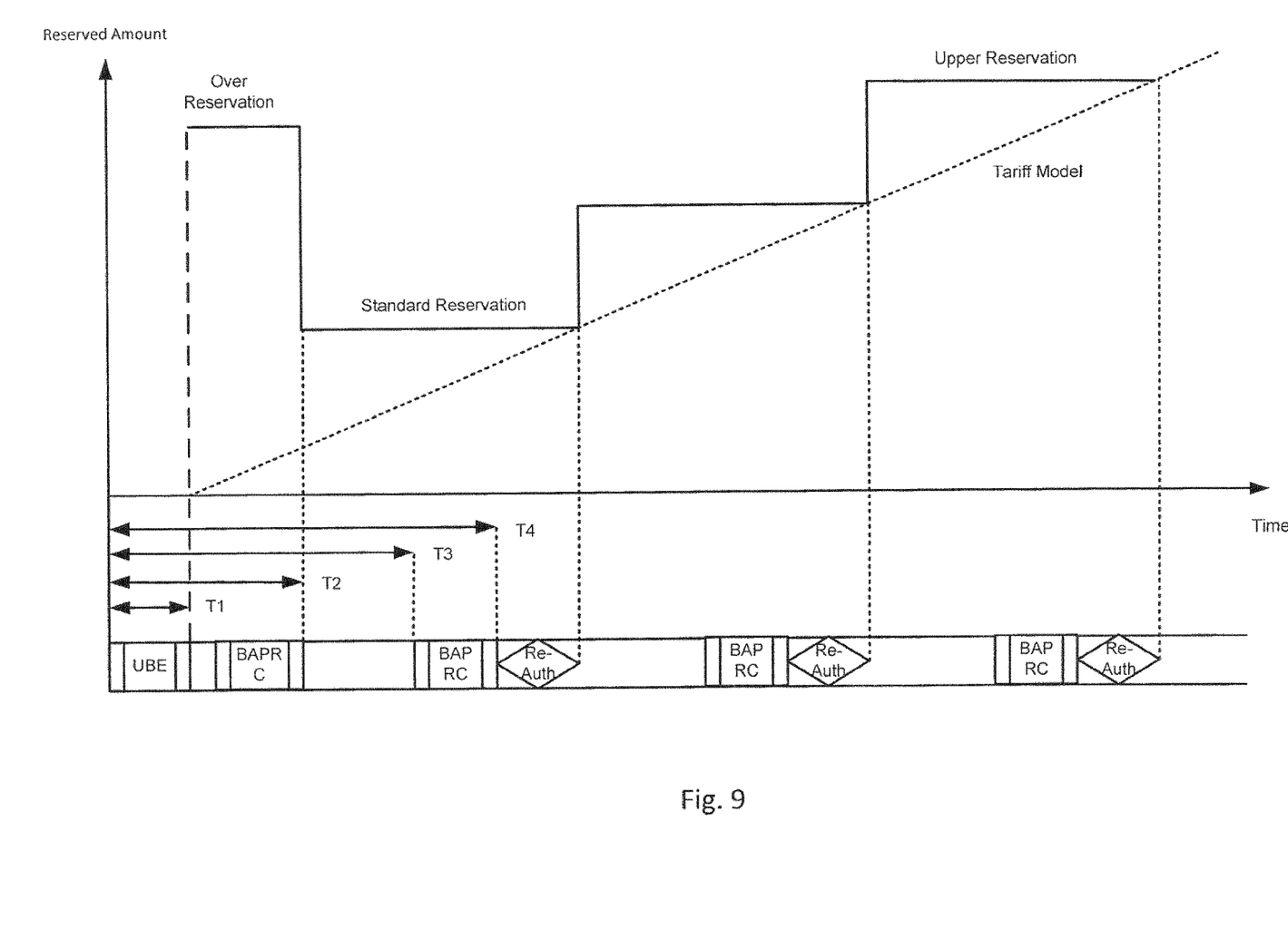
FIG. 9 shows an example of application of the present invention to a charging session in a communication network.

FIG. 9 shows an example of application of concepts according to the present invention to a charging session in a communication network.

As shown in FIG. 9 and explained above in detail, the embodiments of the present invention rely on a division of the charging and authorization process into a real-time service charge estimation and authorization process and a subsequent re-authorization process on the basis of re-calculated service charges.

In more detail and as shown in FIG. 9, the initial estimation of service charges leads to the estimation of an upper bound for service charges UBE within a period of time T1. At the end of this period T1, the service request is admitted to the communication network and there is executed an over reservation at the account according to the result of the initial estimation process.

As shown in FIG. 9, subsequent to the point in time when the over reservation is done, there follows a batch process for service charge calculation BAPRC which terminates after a period of time T2. Upon the re-calculation of the service charges in a batch process, then the over reservation may be corrected to a standard reservation according to the outcome of the service charge calculation.

As shown in FIG. 9, the calculation of the standard reservation relies on a tariff model, i.e. a linear increase of service charges over time. Also, it should be noted that upon termination of the batch process of a service calculation at expiry of the time period T2, the initial real-time service charge estimation and authorization process terminates.

As shown in FIG. 9, subsequent to the end of the initial setup of the service, there follows an execution of batch style service charge calculation and re-authorization in a repeated, e.g., periodic, manner. Here, the re-calculation of service charge is initially executed after expiry of a time period T3, which may also be referenced as a service charge re-calculation time period T3.

It should be noted that such batch style service charge re-calculation is a pre-requisite for re-authorization of the service after expiry of a further time period T4, which may also be referenced as re-authorization time period T4 according to the present invention.

As shown in FIG. 9, with increasing duration of service delivery the reservation and the account increases up to an upper reservation limit. At such a stage of processing it may occur that the charging resources available from the account no longer cover the pre-calculated service charges. Therefore, it is suggested to switch from the batch type rating of a service to a real time actual service price based service re-authorization so as to increase the accuracy of service charge calculation.

As can be seen from FIG. 9, this allows for a continuous variation between pure real-time processing and batch processing in line with a number of services and according to a balance value, an upper bound on quality, or a balancing object of the operator running the communication network.

As outlined above, according to embodiments of the present invention, the standard process is modified by introducing the following concepts:

fast authorization and estimation reservation;
new service charge calculation in an intermediate batch process, optionally with an intermediate booking;
fast re-authorization handling; and
fast end request and batch booking.

Overall, the concepts underlying the present invention narrows a response time distribution function around a peak value reducing the standard deviation of the distribution. This reduces the number of service authorization requests to be degraded, i.e. taken out of the authorization process and thus reduces the possible revenue loss for the operator.

Further, the separation of real-time service charge calculation and authorization and batch mode processing reduces CPU consumption, as in general batch processing is up to a factor of 10 times more efficient.

Still further, complex price calculation with several payments responsible may require several loops over an iteration contract mapping, rating, cost control. All this time-consuming processing may be put into the batch mode type of calculation.

Still further, while above embodiments of the present invention has been explained with respect to different aspects thereof, further modifications are possible in several ways:

A background process might continuously try to find the best current balance value for a service contract, service pair, e.g., the balance may become zero for contracted flat rates. Further, the balance value may also be determined in consideration of a service history of a specific service user or service user group.

Further, an intermediate booking, if required, can be done with the batch mode reservation processing by booking the former reserved amount.

Still further, the various time periods T1 to 14 are freely configurable so as to achieve a balance between processing speed and processing load on the accounting system. E.g., the first service charge pre-calculation request may be avoided by increasing the reservation time of the first service charge determination batch run.

The improvements outlined above are implementable in a batch mode with no "true" time constraints on the accounting system.

The invention claimed is:

1. A method performed by a communication service authorization and communication service charging apparatus operating in a communication network, the method comprising:
    performing a real time service authorization to authorize a request for a communication service provided by the communication network by:
    determining an upper estimate of a service charge for the requested communication service, wherein the requested communication service comprises a request to transfer a volume of data;
    determining whether the upper estimate of the service charge is within a balance value of an account used to charge for the requested communication service;
    responsive to determining the upper estimate of the service charge is within the balance value of the account, authorizing the requested communication service;
    responsive to determining the upper estimate of the service charge is not within the balance value of the account, denying authorization for the requested communication service;
    responsive to denying authorization for the requested communication service:
        determining a real time price calculation for the requested communication service for which authorization was denied;
        determining whether the real time price calculation for the requested communication service for which authorization was denied is within the upper estimate of the service charge;
        responsive to determining the real time price calculation is not within the upper estimate of the service charge, continuing to deny authorization for the requested communication service;
        responsive to determining the real time price calculation is within the upper estimate of the service charge, authorizing the requested communication service for which authorization was previously denied by instructing anode of the communication network to trigger operations that setup a communication session through the communication network for the requested communication service, wherein authorizing the requested communication service for which authorization was previously denied comprises authorizing transfer of a predetermined data volume of the volume of data in the request; and
    calculating an accurate service charge for the requested communication service in a batch mode without real time requirements after authorizing the requested communication service.

2. The method according to claim 1, further comprising reserving the upper estimate at the account upon authorization of the requested communication service.

3. The method according to claim 1, further comprising un-reserving the upper estimate at the account and reserving the accurate service charge for the requested service upon calculation of the accurate service charge.

4. The method according to claim 1, wherein authorizing the requested communication service comprises authorizing the requested communication service for a first service period and scheduling a re-authorization of the requested service before expiry of the first service period.

5. The method according to claim 4, further comprising:
    determining the first service period comprises based on a determined time period to transfer a pre-specified a mount of data of the volume of data based on a load on the communication network during the time period delivery of the requested communication service.

6. The method according to claim 1, further comprising re-calculating an accurate service charge for the requested communication service in a batch mode during service delivery after expiry of a second service period since authorization of the requested communication service.

7. The method according to claim 6, further comprising re-authorizing the requested communication service when the re-calculated accurate service charge is not exceeding the balance value in relation to the account used for charging the requested communication service.

8. The method according to claim 7, wherein the re-calculating the accurate service charge and the re-authorizing the requested communication service are executed repeatedly.

9. The method according to claim 8, wherein the re-calculating the accurate service charge and the re-authorizing the requested communication service are executed periodically according to a next service period.

10. The method according to claim 6, further comprising updating the reservation at the user account according to the re-calculated service charge upon re-authorization of the requested communication service.

11. The method according to claim 7, further comprising switching from calculating the accurate service charge in a batch mode to calculating the accurate service charge in a real time mode when the re-authorization of the requested communication service fails.

12. The method according to claim 6, further comprising aggregating a plurality of service charge re-calculation processes into a batch mode service charge calculation process.

13. The method according to claim 1, further comprising, at the end of service delivery, calculating a final service charge for the requested communication service, un-reserving an amount reserved on the account, and booking the final service charge from the account.

14. The method according to claim 1, wherein denying the requested communication service comprises instructing the node of the communication network to prevent setup of the communication session through the communication network for the requested communication service.

15. An apparatus operating in a communication network and operable to perform a service authorization and a service charging for a communication service provided by the communication network, the apparatus configured to:
  perform a real time service authorization to authorize a request for the communication service by:
  determining an upper estimate of a service charge for the requested communication service, wherein the requested communication service comprises a request to transfer a volume of data;
  determining whether the upper estimate of the service charge is within a balance value of an account used to charge for the requested communication service;
  responsive to determining the upper estimate of the service charge is within the balance value of the account, authorizing the requested communication service;
  responsive to determining the upper estimate of the service charge is not within the balance value of the account, denying authorization for the requested communication service;
  responsive to denying authorization for the requested communication service:
    determining a real time price calculation for the requested communication service for which authorization was denied;
    determining whether the real time price calculation for the requested communication service for which authorization was denied is within the upper estimate of the service charge;
    responsive to determining the real time price calculation is not within the upper estimate of the service charge, continuing to deny authorization for the requested communication service;
    responsive to determining the real time price calculation is within the upper estimate of the service charge, authorizing the requested communication service for which authorization was denied by instructing anode of the communication network to trigger operations that setup a communication session through the communication network for the requested communication service, wherein authorizing the requested communication service for which authorization was previously denied comprises authorizing transfer of a predetermined data volume of the volume of data in the request; and
    calculating an accurate service charge for the requested communication service in a batch mode without real time requirements after authorizing the requested communication service.

16. The apparatus according to claim 15, further comprising a reserving unit adapted to reserve the upper estimate at the account upon authorization of the requested communication service.

17. The apparatus according to claim 15 wherein the reserving unit is adapted to un-reserve the upper estimate at the account and to reserve the accurate service charge for the requested service upon calculation of the accurate service charge.

18. The apparatus according to claim 15, wherein the authorization unit is adapted to authorize the requested communication service for a first service period and further comprising a scheduling unit adapted to schedule a re-authorization of the requested communication service before expiry of the first service period.

19. The apparatus according to claim 15, wherein the service charge calculation unit is adapted to re-calculate an accurate service charge for the requested communication service in a batch mode during service delivery after expiry of a second service period since admission of the requested service.

20. The apparatus according to claim 19, wherein the authorizing unit is adapted to re-authorize the requested communication service when the re-calculated accurate service charge is not exceeding the balance value in relation to the account used for charging the requested communication service.

21. The apparatus according to claim 20, wherein the service charge calculation unit and the authorizing unit are adapted to re-calculate the accurate service charge and to re-authorize the requested communication service repeatedly.

22. The apparatus according to claim 21, wherein the service charge calculation unit and the authorizing unit are adapted to re-calculate the accurate service charge and to re-authorize the requested communication service periodically according to a next service period.

23. The apparatus according to claim 19, wherein the reserving unit is adapted to update the reservation at the user account according to the re-calculated service charge upon re-authorization of the requested communication service.

24. The apparatus according to claim 20, further comprising a controller unit adapted to switch from calculating the accurate service charge in a batch mode to calculating the accurate service charge in a real time mode when the re-authorization of the requested communication service fails.

25. The apparatus according to claim 19, wherein the controller unit is adapted to aggregate a plurality of service charge re-calculation processes into a batch mode service charge calculation process.

26. The apparatus according to claim 15, wherein the controller unit is adapted to trigger, at the end of service delivery, a calculation of a final service charge for the requested service, an un-reservation of an amount reserved on the account, and a booking of the final service charge from the account.

* * * * *